US011683588B2

(12) United States Patent
Tabuchi

(10) Patent No.: US 11,683,588 B2
(45) Date of Patent: Jun. 20, 2023

(54) METHODS AND APPARATUS FOR OPTICAL IMAGE STABILIZATION

(71) Applicant: SEMICONDUCTOR COMPONENTS INDUSTRIES, LLC, Phoenix, AZ (US)

(72) Inventor: Yoshihisa Tabuchi, Gifu (JP)

(73) Assignee: SEMICONDUCTOR COMPONENTS INDUSTRIES, LLC, Scottsdale, AZ (US)

(*) Notice: Subject to any disclaimer, the term of this patent is extended or adjusted under 35 U.S.C. 154(b) by 0 days.

(21) Appl. No.: 17/643,207

(22) Filed: Dec. 8, 2021

(65) Prior Publication Data
US 2022/0191398 A1    Jun. 16, 2022

Related U.S. Application Data

(60) Provisional application No. 63/199,256, filed on Dec. 16, 2020.

(51) Int. Cl.
*H04N 23/68* (2023.01)
*G03B 5/00* (2021.01)
*H04N 23/55* (2023.01)

(52) U.S. Cl.
CPC ............. *H04N 23/687* (2023.01); *G03B 5/00* (2013.01); *H04N 23/55* (2023.01); *H04N 23/6812* (2023.01); *G03B 2205/0007* (2013.01); *G03B 2205/0053* (2013.01)

(58) Field of Classification Search
CPC ........ H04N 5/23287; G03B 2205/0007–0015; G03B 2205/0038; G02B 27/64; G02B 27/646
See application file for complete search history.

(56) References Cited

U.S. PATENT DOCUMENTS

| 2007/0201848 A1* | 8/2007 | Taguchi ............. H04N 5/23248 348/E5.025 |
| 2017/0302853 A1* | 10/2017 | Shigeoka ............... H04N 5/243 |
| 2018/0184005 A1 | 6/2018 | Morotomi et al. |
| 2019/0045095 A1 | 2/2019 | Tanimukai et al. |
| 2019/0191092 A1* | 6/2019 | Imanishi ............... G02B 27/646 |
| 2020/0288061 A1* | 9/2020 | Grenet ............... H04N 5/23258 |
| 2020/0296294 A1* | 9/2020 | Miyazawa ......... H04N 5/23218 |

* cited by examiner

*Primary Examiner* — Paul M Berardesca
(74) *Attorney, Agent, or Firm* — Dickinson Wright PLLC

(57) ABSTRACT

Various embodiments provide an optical image stabilization system, comprising: a sensor configured to detect a disturbance signal; a processor; an actuator; and an actuator driver. The sensor can be configured to detect a disturbance signal, wherein the disturbance signal applies a force to a moving body, and wherein the force causes the moving body to displace. The processor can be configured to determine: a target position of the moving body according to the detected disturbance signal; and a corrected driving current according to the target position. The actuator can be configured to: receive the corrected driving current receive the corrected driving current; and position the moving body in response to receiving the corrected driving current, wherein the moving body is positioned in a direction opposite to that of the displacement. The actuator driver can be configured to controllably operate the actuator according to the corrected driving current.

12 Claims, 8 Drawing Sheets

METHODS AND APPARATUS FOR OPTICAL IMAGE STABILIZATION

CROSS-REFERENCE TO RELATED APPLICATIONS

This U.S. Patent Application claims the benefit of and priority to U.S. Provisional Patent Application No. 63/199,256, filed Dec. 16, 2020, titled "Methods and Apparatus for Optical Stabilization", which is incorporated by reference herein in its entirety.

BACKGROUND

Optical image stabilization ("OIS") is a technique that reduces blurring associated with the motion of a camera or other imaging device during exposure. Generally, OIS compensates angular movement of the imaging device, though electronic image stabilization.

Typically, an OIS uses a combination of hardware and software processing designed to deliver clear and sharp photos even in low light. For example, a sensor capturing the image can be moved in such a way as to counteract the motion of the imaging device, a technology often referred to as mechanical image stabilization. When the imaging device rotates, causing angular error, gyroscopes encode information to the actuator that moves the sensor. The sensor is moved to maintain the projection of the image onto the image plane, which is a function of the focal length of the lens being used. The sensor is moved to maintain the projection of the image onto the image plane, which is a function of the focal length of the lens being used.

Currently most images are now taken with smart phones, which have a fixed focal length, mechanical OIS are ineffective and are often too large to fit within the dimensions of the smart phone. Improvements are needed for OIS for imaging devices, including cameras built into smart phones.

SUMMARY

Various embodiments provide an optical image stabilization system, comprising: a sensor configured to detect a disturbance signal; a processor; an actuator; and an actuator driver.

The sensor can be configured to detect a disturbance signal, wherein the disturbance signal applies a force to a moving body, and wherein the force causes the moving body to displace.

The processor can be configured to determine: a target position of the moving body according to the detected disturbance signal; and a corrected driving current according to the target position.

The actuator can be configured to: receive the corrected driving current receive the corrected driving current; and position the moving body in response to receiving the corrected driving current, wherein the moving body is positioned in a direction opposite to that of the displacement.

The actuator driver can be configured to controllably operate the actuator according to the corrected driving current. The actuator can comprise a voice coil motor, and wherein the voice coil motor comprises a magnet configured to move the moving body.

In some configurations, the moving body comprises a lens. The optical image stabilization system can comprise a position sensor configured to measure movements of the moving body. The system can comprise a Hall sensor capable of detecting a magnetic field produced by the magnet.

Various embodiments provide methods for improving optical image stabilization. A method can comprise the steps of detecting a disturbance signal applied to a moving body, wherein the disturbance signal applies a force to the moving body, and wherein the force causes the moving body to displace; converting the disturbance signal to an output signal; generating an offset-corrected output signal from the output signal; generating a phase-corrected output signal from the offset-corrected output signal; generating a corrected driving current according to the phase-corrected output signal; and using the corrected driving current to position the moving body in a direction opposite to that of the displacement.

The output signal can be an acceleration signal. The offset-corrected output signal can be free from an offset error. The phase-corrected output signal can be shifted in phase with respect to the offset-corrected output signal. The method can include the step of determining the corrected driving current according to a method substantially described herein.

BRIEF DESCRIPTION OF THE DRAWINGS

A more complete understanding of the present technology can be derived by referring to the detailed description when considered in connection with the following illustrative figures. In the following figures, like reference numbers refer to similar elements and steps throughout the figure.

DETAILED DESCRIPTION

The present technology can be described in terms of functional block components and various processing steps. Such functional blocks can be realized by any number of components configured to perform the specified functions and achieve the various results. For example, the present technology can employ various types of acceleration sensors, actuators, attenuators, amplifiers, coils, converters, drivers, filters, gyro sensors, image sensors, magnets, processors, sensors, signal generators, and the like, which can carry out a variety of functions. In addition, the present technology can be practiced in conjunction with any number of applications, and the apparatus described is merely one exemplary application for the technology. In addition, the present technology can be integrated in any number of electronic systems, such as automotive, aviation, mobile devices, and consumer electronics, and the systems described are merely exemplary applications for the technology.

The apparatus according to various aspects of the present technology can be used in conjunction with any electronics equipped with an optical image stabilization (OIS) function. Various representative implementations of the present technology can be applied, for example, to smart mobile devices, such as a cell phone or tablet, with a camera.

Various embodiments are directed toward an OIS having an actuator control circuit that can be controlled in either an open-loop or a closed-loop. The OIS can be integrated in any suitable electronic device that uses an image sensor, such as a cell phone, tablet, and the like, to reduce blurring associated with the motion of the electronic device.

Figure 1:
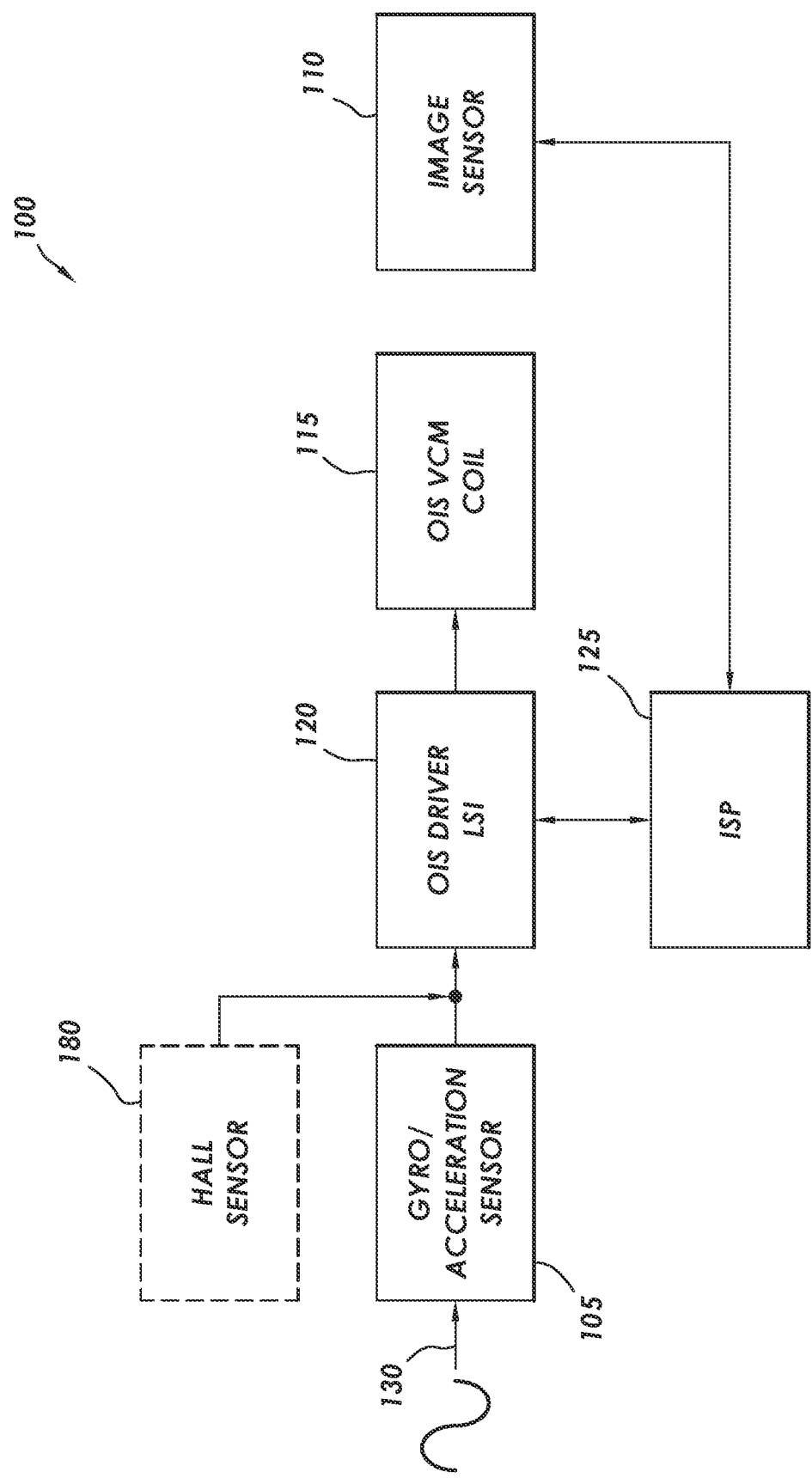
FIG. 1 is a block diagram illustrating an optical image stabilization system, in accordance with various embodiments of the present technology.

With reference to FIG. 1, a block diagram illustrates an optical image stabilization system 100, in accordance with various embodiments of the present technology. The system 100 can comprise a gyro sensor 105, an image sensor 110, an actuator 115, an actuator control driver 120, and an image signal processor 125. In some embodiments, the system 100 can comprise one or more position sensors 180 (e.g., Hall detectors).

A disturbance signal 130 is a movement, such as a vibration, panning, or the like, applied to the system 100 in an X-axis direction, a Y-axis direction, and/or a Z-axis direction. As known to one of skill in the art, the X-axis direction and the Y-axis direction are defined to be orthogonal to the Z-axis direction.

The gyro sensor 105 detects the disturbance signal 130. The gyro sensor 105 can generate sensor data, such as velocity information and/or acceleration information associated with the disturbance signal 130. For example, the sensor data can comprise angular velocity and/or acceleration values that are applied to the system 100 in the X-axis direction, Y-axis direction, and/or Z-axis direction. In some embodiments, an acceleration sensor can be used in conjunction with the gyro sensor 105. In other embodiments directed to a movement in a single direction, an acceleration sensor can be used in lieu of the gyro sensor 105. The gyro sensor 105 transmits the sensor data to the actuator control driver 120 for processing.

The gyro sensor 105 can be mounted on an electronic device and formed on a separate chip from the actuator control driver 120. Alternatively, the gyro sensor 105 can be formed on the same chip as the actuator control driver 120. In some embodiments, the gyro sensor 105 is an inertial measurement unit ("IMU").

The actuator control driver 120 can receive image data from an image sensor 110. Pixelated data captured by the image sensor 110 is sent to the image signal processor 125. The pixelated data is process by the image signal processor 125 into image data, which is transmitted to the actuator control driver 120. The image sensor 110 can be configured to capture an image, either as a photo or as video. The image sensor 110 can be an image collection device, such as, a charge-coupled device ("CCD"), which can be a transistorized light sensor on an integrated circuit. The image sensor 110 can include a lens.

The image signal processor 125 encodes and decodes the light information generated by the image sensor 110 to the nonlinear information for human eyes watching display. The image signal processor 125 can analyze dynamic range of an image and adjusts the brightness to correct the contrast of dark and bright areas of the image. The image signal processor 125 can apply color correction matrices to the image to adjust the colors and ensure proper color fidelity in the image.

The actuator control driver 120 can be an OIS driver. In some embodiments, the actuator control driver 120 is an OIS driver LSI ("large scale integration"), which can include other components on a single chip. For example, the OIS driver LSI can include auto focusing ("AF") functions. The OIS driver LSI can include peripherals, for example, AD converters, DA converters, serial interface circuits, Hall detector bias and/or amplification, and/or a gyro interface. The image signal processor 125 can be integrated in the OIS driver LSI. The gyro sensor 105 can be integrated in the OIS driver LSI. The OIS driver LSI can include built-in software, for example, software configured to process the sensor data from the gyro sensor 105 and/or software configured to process the image data from the image signal processor 125. The OIS driver LSI can have memory built into the chip, which can be formatted as ROM, EEPROM, and/or SRAM. The OIS driver LSI can include one or more drivers, such as the OIS driver and/or an AF driver, which can be configured as bidirectional. Other components, not included herein, can integrated in the OIS driver LSI, as will be apparent to one of skill in the art.

In some embodiments, the actuator control driver 120 can be integrated on a single semiconductor substrate. In some embodiments, all the circuit components of the actuator control driver 120 can be integrated on a single semiconductor substrate. In another embodiments, certain circuit components, such as an offset correction component, a phase correction component, and an inertial force cancellation circuit (which are described below), can be integrated on a single chip while residual circuit components can be integrated on a separate chip. It will be appreciated that it can be advantageous to integrate the circuit components on a single chip to reduce chip surface area and to ensure uniformity among the characteristics of the circuit components. It will also be appreciated that it can be advantageous to integrate residual circuit components, such as resistors and capacitors, on a separate chip to more easily adjust their parameters.

The actuator control driver 120 can receive, from the gyro sensor 105, the output signals via a signal line or other suitable communication line. The actuator control driver 120 can use the sensor data to provide corrected driving currents, in the X-axis direction and the Y-axis direction, to the actuator 115. The corrected driving currents can be used to control the actuator 115, which in turn can be used to generate a driving force to position a moving body, such as, for example a lens in an imaging device, in the X-axis direction, the Y-axis direction, and/or the Z-axis direction.

Figure 2:
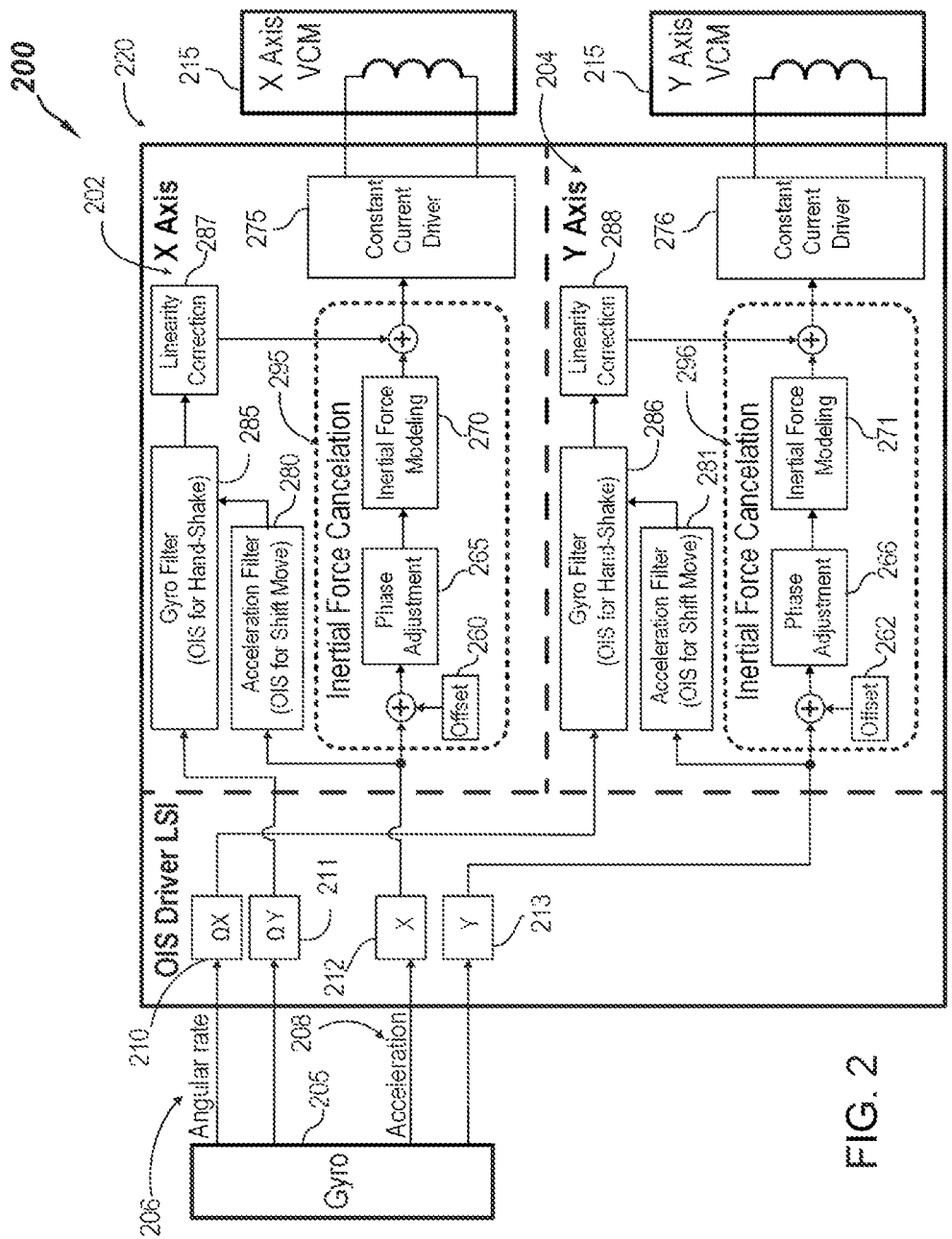
FIG. 2 is a block diagram illustrating an exemplary open-loop actuator control circuit, in accordance with various embodiments of the present technology.

Moving to FIG. 2, a block diagram illustrates an exemplary optical image stabilization system 200 having an open-loop actuator control driver 220, in accordance with various embodiments of the present technology.

The system 200 can comprise a gyro sensor 205, the open-loop actuator control driver 220, an X-axis actuator 215, and a Y-axis actuator 216. In some embodiments, an actuator is an electric motor. The system 200 can further include an image sensor and an ISP (not picture), as described above. The open-loop actuator control driver 220 can be integrated into an OIS driver LSI.

As illustrated in FIG. 2, the actuator control driver 220 is divided into an X-axis driver 202 and a Y-axis driver 204. The X-axis driver 202 is in communication with the X-axis actuator 215. The Y-axis driver 204 is in communication with the Y-axis actuator 216.

The X-axis driver 202 can comprise an acceleration filter 280, a gyro filter 285, a linearity correction component 287, a constant current driver 275, and an X-axis inertial force cancellation circuit 295. The X-axis inertial force cancellation circuit 295 can comprise an offset correction component 260, a phase adjustment component 265, and an inertial force modeling component 270.

The Y-axis driver 204 can comprise an acceleration filter 281, a gyro filter 286, a linearity correction component 288, a constant current driver 276, and a Y-axis inertial force cancellation circuit 296. The Y-axis inertial force cancellation circuit 296 can comprise an offset correction component 261, a phase adjustment component 266, and an inertial force modeling component 271.

The offset correction components 260, 261 can be configured to produce offset-corrected output signals that are substantially free from offset errors and/or biases present in the output signals that are received from the gyro sensor 205. The offset errors and/or biases can be direct current (DC) offset errors and/or biases. The offset errors and/or biases present in the output signals can be noise signals and are thus an unwanted addition to a desired information signal, such as the acceleration signal. The magnitude of the offset errors and/or biases can depend upon the type of gyro sensor 205 being used in the system 200 (or system 300 illustrated in FIG. 3) and can depend on certain factors, such as the size of the gyro sensor 205 and/or the temperature of the environment in which the gyro sensor 205 is operating in. The magnitude of the offset errors and/or biases can be predetermined using any suitable calibration method, such as by measuring the amplitude of signals detected by the gyro sensor 205 when the gyro sensor 205 is operating in a reference state (i.e., where the gyro sensor 205 is not being acted upon by the disturbance signal). Because the gyro sensor 205 is not being acted upon by the disturbance signal during the reference state, signals that are detected can be considered the noise signals. It will be appreciated that a large number of noise readings can be taken from the gyro sensor 205 such that an average amplitude of the noise signals can be determined to more accurately determine the magnitude of the offset errors and/or biases. Accordingly, the offset correction components 260, 261 can be configured to generate the offset-corrected output signals by subtracting a signal equal in magnitude to the noise signal from the output signals. The offset correction components 260, 261 can transmit the offset-corrected output signals to a phase correction component for additional processing.

The phase correction components 265, 266 can receive the offset-corrected output signals from the offset correction components 260, 261 via a signal line or any suitable communication line. The phase correction components 265, 266 can be configured to correct a phase offset error present in the offset-corrected output signals received from the offset correction components 260, 261 by generating phase-corrected output signals that are shifted in phase with respect to the offset-corrected output signals supplied to it from the offset correction components 260, 261.

The phase offset error can be a difference in phase angle between the disturbance signal applied to the system 200, 300 and the resulting acceleration data 208 detected by the gyro sensor 205 and applied to the moving body for any given frequency at which the disturbance signal operates. The phase offset error can be caused by a misalignment of the actuator control driver 220, a time constant of the gyro sensor 205, a frequency of a disturbance signal that is beyond the maximum allowed bandwidth of the gyro sensor 205, a communication delay between the gyro sensor 205 and the actuator control driver 220, and the like.

The inertial force modeling components 270, 271 can receive the phase-corrected output signals from the respective phase adjustment components 265, 266. The inertial force modeling components 270, 271 can be configured to perform various functions, such as amplification, signal conversion, analysis and the like, to perform an inertial force correction scheme. The inertial force modeling components 270, 271 can comprise any suitable signal gain controller capable of amplifying the signals received from the phase offset correction components such as an attenuator, amplifier, or the like. The inertial force modeling components 270, 271 can amplify the phase-corrected output signals by one or more predetermined coefficients to match the amplitude of the driving current needed to produce the driving force for positioning the moving body according to a target position determined by a processor. The inertial force modeling components 270, 271 can transmit the amplified phase-corrected output signals to a respective constant current driver 275, 276, which in turn can provide the corrected driving currents to the X-axis actuator 215 and the Y-axis actuator 216.

The gyro sensor 205 detects a disturbance (as described above) and transmits sensor data to the actuator control driver 220. The senor data includes angular rate data 206 and acceleration data 208. The angular rate data 206 is received by an X-block 210, which receives the angular rate data in the X direction and by a Y-block 211, which receives the angular rate data in the Y direction. The angular rate data in the X direction received by the X-block 210 is transmitted to the gyro filter 286 in the driver 204. The angular rate data in the Y direction received by the Y-block 211 is transmitted to the gyro filter 285 in the driver 202.

The acceleration data 208 is received by an X-block 212, which receives the acceleration data in the X direction and by a Y-block 213, which receives the acceleration data in the Y direction. The acceleration data in the X direction received by the X-block 212 is transmitted to the acceleration filter 280 and the X-axis inertial force cancellation circuit 295 in the X-axis driver 202. The acceleration data in the Y direction received by the Y-block 213 is transmitted to the acceleration filter 281 and the Y-axis inertial force cancellation circuit 296 in the Y-axis driver 204.

The X-axis driver 202 receives the angular rate data from Y-block 211 and the acceleration data from X-block 212. The angular rate data and the acceleration data, via the acceleration filter 280, which smooths the data, are received by a gyro filter 285, which removes signal noise and may smooth other variations in the data. The smoothed data generated by the gyro filter 285 is sent to the linearity correction component 287, which a correction of non-linearity effects in gyro sensor 205. The linearity correction component 287 outputs linearity corrected data.

Simultaneously, the acceleration data is received by the X-axis inertial force cancellation circuit 295. The acceleration data is first received by the offset correction component 260, which produces and transmits offset-corrected output signals that are substantially free from offset errors and/or biases present in the output signals that are received from the gyro sensor 205. The offset-corrected output signals are received by the phase adjustment component 265, which corrects a phase offset error present in the offset-corrected output signals by generating phase-corrected output signals that are shifted in phase with respect to the offset-corrected output signals. Phase corrected output signal is transmitted by the phase adjustment component 265 and are received by the inertial force modeling component 270, which can be configured to perform various functions, such as amplification, signal conversion, analysis and the like, to perform an inertial force correction scheme.

The phase corrected output signal can be amplified as modeled by the inertial force modeling component 270 to produce an amplified phase-corrected output signal, which is transmitted to the constant current driver 275, which in turn can provide the corrected driving currents to the X-axis actuator 215. The corrected driving currents move the X-axis actuator 215 to cancel, in real time, an inertial force on a moving body (such as a camera lens) connected to the X-axis actuator 215.

The Y-axis driver 204 receives the angular rate data from X-block 210 and the acceleration data from Y-block 213. The angular rate data and the acceleration data, via the acceleration filter 281, which smooths the data, are received by a gyro filter 286, which removes signal noise and may smooth other variations in the data. The smoothed data generated by the gyro filter 286 is sent to the linearity correction component 288, which a correction of non-linearity effects in gyro sensor 205. The linearity correction component 288 outputs linearity corrected data.

Simultaneously, the acceleration data is received by the Y-axis inertial force cancellation circuit 296. The acceleration data is first received by the offset correction component 261, which produces and transmits offset-corrected output signals that are substantially free from offset errors and/or biases present in the output signals that are received from the gyro sensor 205. The offset-corrected output signals are received by the phase adjustment component 266, which corrects a phase offset error present in the offset-corrected output signals by generating phase-corrected output signals that are shifted in phase with respect to the offset-corrected output signals. Phase corrected output signal is transmitted by the phase adjustment component 266 and are received by the inertial force modeling component 271, which can be configured to perform various functions, such as amplification, signal conversion, analysis and the like, to perform an inertial force correction scheme.

The phase corrected output signal can be amplified as modeled by the inertial force modeling component 271 to produce an amplified phase-corrected output signal, which is transmitted to the constant current driver 276, which in turn can provide the corrected driving currents to the Y-axis actuator 216. The corrected driving currents move the Y-axis actuator 216 to cancel, in real time, an inertial force on a moving body (such as a camera lens) connected to the Y-axis actuator 216.

Figure 3:
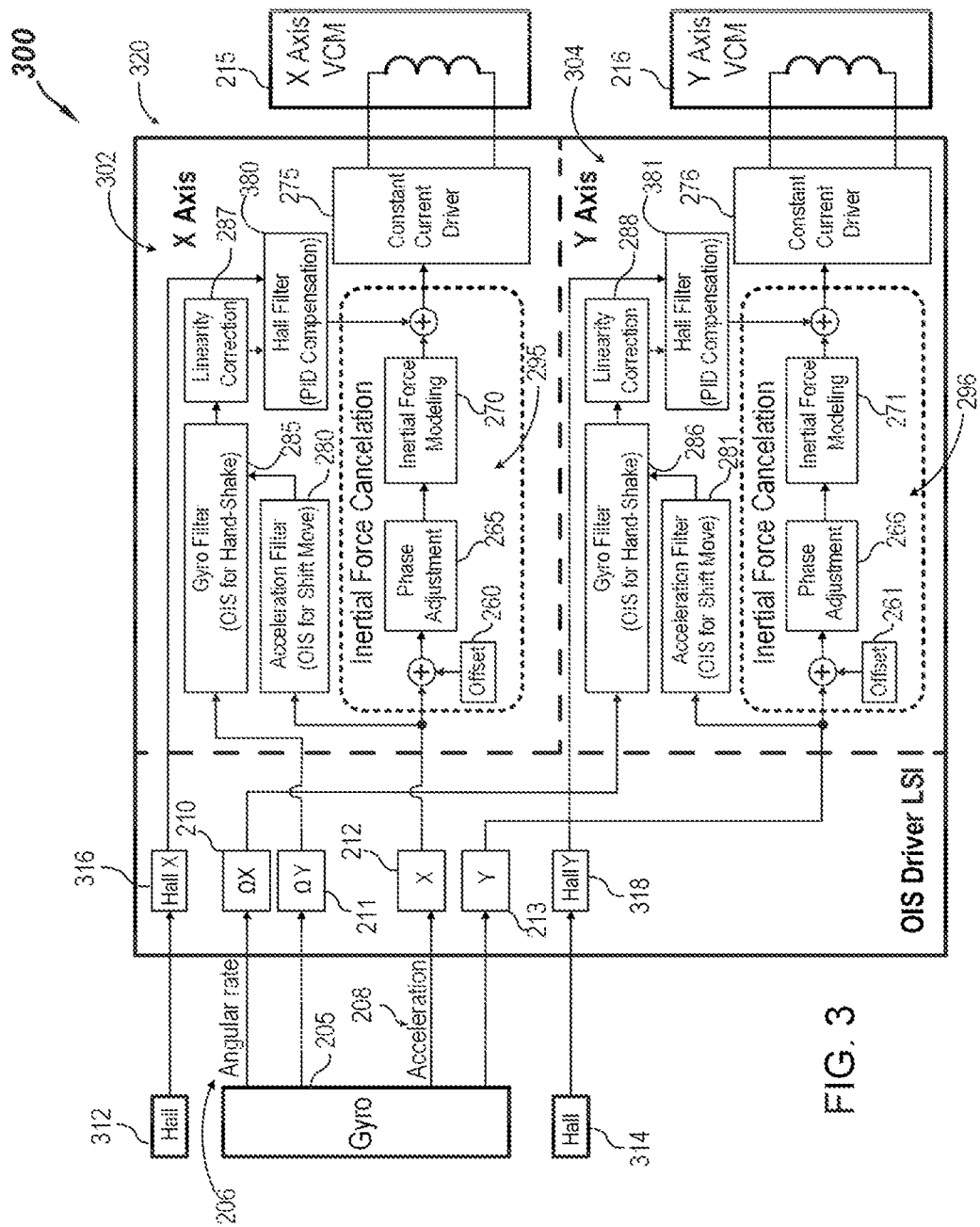
FIG. 3 is a block diagram illustrating an exemplary closed-loop actuator control circuit, in accordance with various embodiments of the present technology.

Turning to FIG. 3, a block diagram illustrates an exemplary optical image stabilization system 300 having a closed-loop actuator control driver 320, in accordance with various embodiments of the present technology.

The system 300 can comprise a gyro sensor 205, the closed-loop actuator control driver 320, an X-axis actuator 215, and a Y-axis actuator 216. In some embodiments, an actuator is an electric motor. The system 300 can further include an image sensor and an ISP (not picture), as described above. The closed-loop actuator control driver 320 can be integrated into an OIS driver LSI.

As illustrated in FIG. 3, the actuator control driver 320 is divided into an X-axis driver 302 and a Y-axis driver 304. The X-axis driver 302 is in communication with the X-axis actuator 215. The Y-axis driver 304 is in communication with the Y-axis actuator 216.

The X-axis driver 302 can comprise an acceleration filter 280, a gyro filter 285, a linearity correction component 287, a constant current driver 275, and an X-axis inertial force cancellation circuit 295. The X-axis inertial force cancellation circuit 295 can comprise an offset correction component 260, a phase adjustment component 265, and an inertial force modeling component 270, as described above.

The Y-axis driver 304 can comprise an acceleration filter 281, a gyro filter 286, a linearity correction component 288, a constant current driver 276, and a Y-axis inertial force cancellation circuit 296. The Y-axis inertial force cancellation circuit 296 can comprise an offset correction component 261, a phase adjustment component 266, and an inertial force modeling component 271, as described above.

The system 300 can comprise at least position sensor, which is in communication with the actuator control driver 320. In some embodiments, the system can comprise an X-axis position sensor in communication with the X-axis driver 302 and a Y-axis position sensor in communication with the Y-axis driver 304.

For example, the X-axis position sensor can be an X-axis Hall detector 312 and the Y-axis position sensor can be a Y-axis Hall detector 314. As the gyro sensor 205 is sending sensor data to the actuator control driver 320, such as, angular rate data 206 and acceleration data 208, the X-axis Hall detector 312 and the Y-axis Hall detector 314 send position data simultaneously to the actuator control driver 320.

As illustrated in FIG. 3, the gyro sensor 205 detects a disturbance (as described above) and transmits angular rate data 206 and acceleration data 208 to the actuator control driver 320. The angular rate data 206 is received by an X-block 210, which receives the angular rate data in the X direction and by a Y-block 211, which receives the angular rate data in the Y direction. The X-block 210 and the Y-block 211 transmit the angular rate data, as described in FIG. 2. After the angular rate data is transmitted by the X-block 210 and the Y-block 211, the angular rate data is processed using the components, as described in FIG. 2.

The acceleration data 208 is received by an X-block 212, which receives the acceleration data in the X direction and by a Y-block 213, which receives the acceleration data in the Y direction. The X-block 212 and the Y-block 213 transmit the acceleration data, as described in FIG. 2. After the acceleration data is transmitted by the X-block 210 and the Y-block 211, the acceleration data is processed using the components, as described in FIG. 2.

In contrast to FIG. 2, the X-axis Hall detector 312 transmits X-axis position data to Hall X-block 316 and the Y-axis Hall detector 314 transmits Y-axis position data to Hall Y-block 318. The X-axis position data is transmitted from the Hall X-block 316 to a Hall filter 380. The Y-axis position data is transmitted from the Hall Y-block 318 to a Hall filter 381. In some embodiments, a Hall filter calculate position compensation, which is based on the position data received from the position sensor. In some embodiments, a Hall filter calculate position compensation, which is based data received from a linearity component and on the position data received from the position sensor.

The Hall filter 380 receives the X-axis position data and a correction of non-linearity effects in gyro sensor 205 from the linearity correction component 287. Using the X-axis position data and the correction of non-linearity effects the Hall filter 380 calculates a position compensation value for the X-axis. The output of the inertial force modeling component 270 in the X-axis inertial force cancellation circuit 295 is corrected by the position compensation value and the result is sent to the constant current driver 275. The constant current driver 275 provides the power and direction, as corrected by the position compensation value for X-axis, to move the X-axis actuator 215 to cancel, in real time, an inertial force on a moving body (such as a camera lens) connected to the X-axis actuator 215.

The Hall filter 381 receives the Y-axis position data and a correction of non-linearity effects in gyro sensor 205 from the linearity correction component 288. Using the Y-axis position data and the correction of non-linearity effects, the Hall filter 381 calculates a position compensation value. The output of the inertial force modeling component 271 in the Y-axis inertial force cancellation circuit 296 is corrected by the position compensation value and the result is sent to the constant current driver 276. The constant current driver 276 provides the power and direction, as corrected by the position compensation value, for Y-axis position to move the Y-axis actuator 216 to cancel, in real time, an inertial force on a moving body (such as a camera lens) connected to the Y-axis actuator 216.

Figure 4:
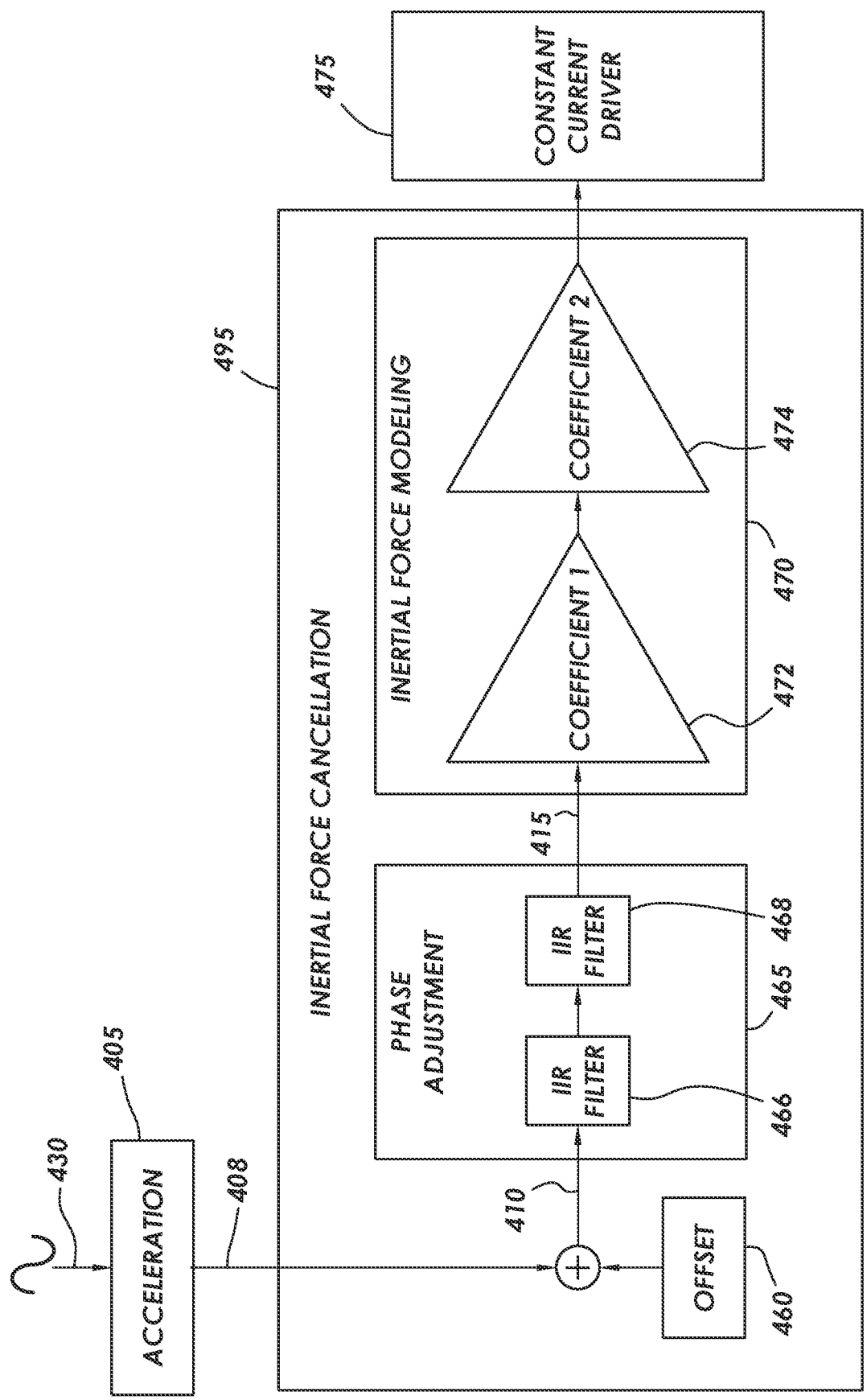
FIG. 4 is a block diagram illustrating an exemplary inertial force cancellation circuit, in accordance with various embodiments of the present technology.

Turning to FIG. 4, block diagram illustrates an exemplary inertial force cancellation circuit, in accordance with various embodiments described herein. A gyro sensor 405 detects a disturbance 430 and transmits acceleration data 408 is to an inertial force cancellation circuit 495.

The acceleration data 408 is first received by an offset correction component 460, which produces and transmits offset-corrected output signals 410 that are substantially free from offset errors and/or biases present in the output signals that are received from the gyro sensor 405. The offset-corrected output signals 410 are received by the phase adjustment component 465.

In some embodiments, the phase adjustment component 465 comprises one or more suitable filters capable of substantially removing the phase offset errors present in the offset-corrected output signals, such as an infinite impulse response ("IIR") filter, or the like. The one or more filters can be a low-boost filter, a high-boost filter, or the like. For example, the phase adjustment component 465 can comprise a first IIR filter 466, which provides a filtered signal to a second IIR filter 468. The first IIR filter 466 and the second IIR filter 468 in the phase adjustment component 465 can correct a phase offset error present in the offset-corrected output signals 410 by generating phase-corrected output signals that are shifted in phase with respect to the offset-corrected output signals. Phase corrected output signal 415 is transmitted by the phase adjustment component 465 and are received by the inertial force modeling component 470. In some embodiments, the first IIR filter 466 can be a high-boost filter and the second IIR filter 468 can be a low-boost filter. In some embodiments, the first IIR filter 466 can be a low-boost filter and the second IIR filter 468 can be a high-boost filter.

In some embodiments, the inertial force modeling component 470 can comprise a first coefficient 472, which can provide corrected signals to a second coefficient 474. The first coefficient 472 and the second coefficient 474 can be algorithms, which are modeled to calculate inertial forces in a particular direction. Examples of such algorithms are discussed below. The phase corrected output signal 415 can be received by the first coefficient 472, which recalculates the signal using an algorithm and/or a factor coefficient producing a first recalculated phase corrected output signal that is sent to the second coefficient 474. The first recalculated phase corrected output signal can be received by the second coefficient 474, performs a second recalculate of the signal using a different algorithm and/or factor coefficient producing a second recalculated phase corrected output signal, which is transmitted to the constant current driver 475. As described herein, the constant current driver 475 can provide the corrected driving currents to an actuator, which can move the actuator to cancel, in real time, an inertial force on a moving body (such as a camera lens) connected to the actuator. In some embodiments, the first coefficient 472 can be modeled for characterization and the second coefficient 474 can be modeled for calibration.

Figure 5:
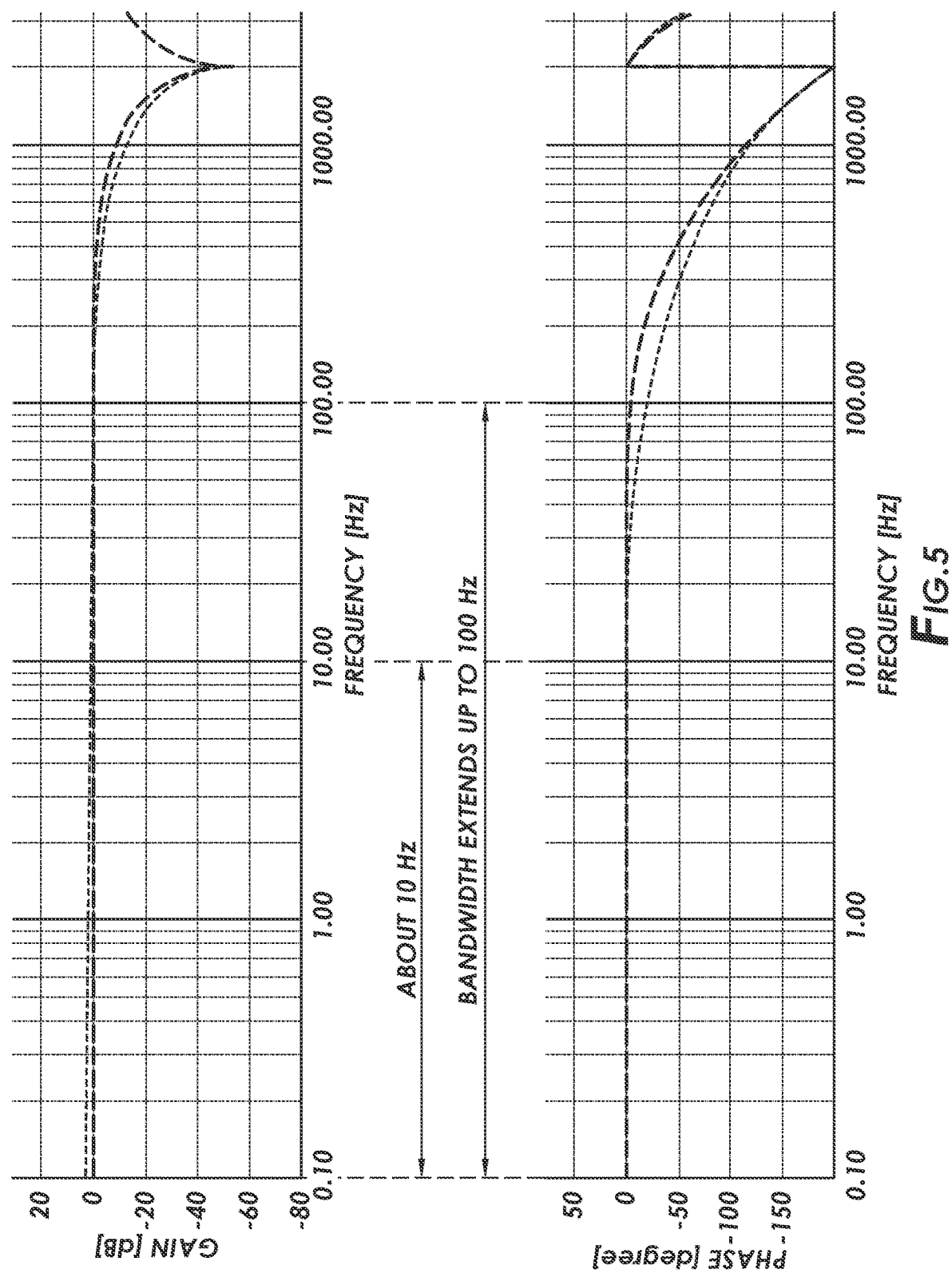
FIG. 5 is a graph illustrating an example of a difference in phase angle between a disturbance signal applied to the optical image stabilization system and a resulting acceleration signal applied to a portion of the optical image stabilization system, in accordance with various embodiments of the present technology.

With reference to FIG. 5, a first graph illustrates an example of a difference in phase angle between a disturbance signal applied to an OIS system and a second graph illustrates a resulting acceleration signal applied to a portion of the OIS system. As shown in the first graph, when a disturbance signal is operating at a frequency of 100 Hz and is applied to an OIS, there can be a sizable phase offset error (e.g., in or around 20 degrees) between a disturbance signal applied to the OIS system and the resulting acceleration signal detected by the gyro sensor and applied to the moving body. Because the acceleration signal causes a force to be applied to the moving body, the phase offset error can cause the moving body to vibrate uncontrollably.

Figure 6:
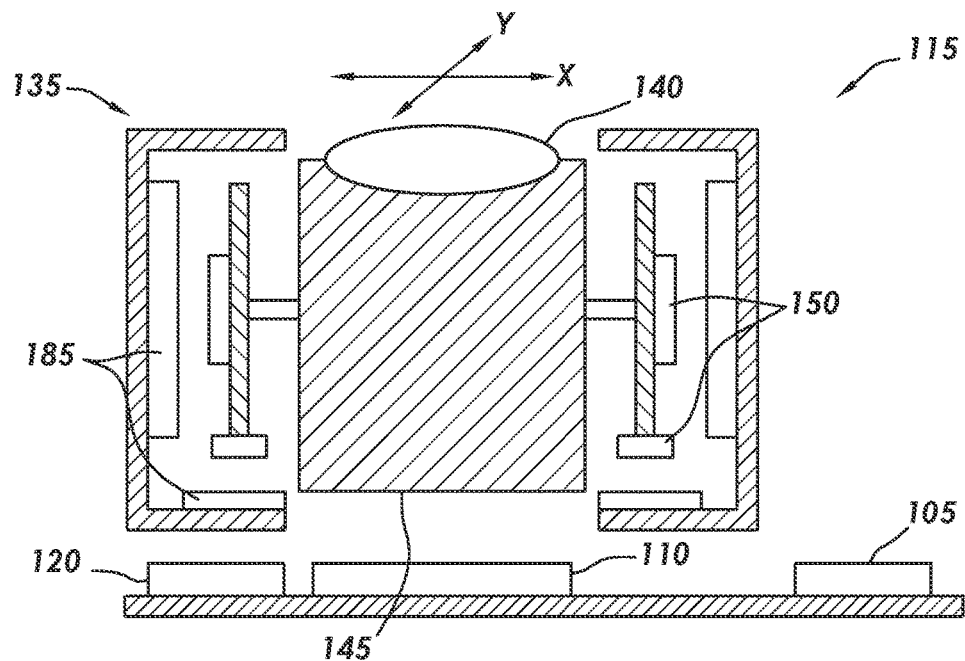
FIG. 6 is a block diagram illustrating an exemplary optical image stabilization system controlling a moving body, in accordance with various embodiments of the present technology.
Figure 7:
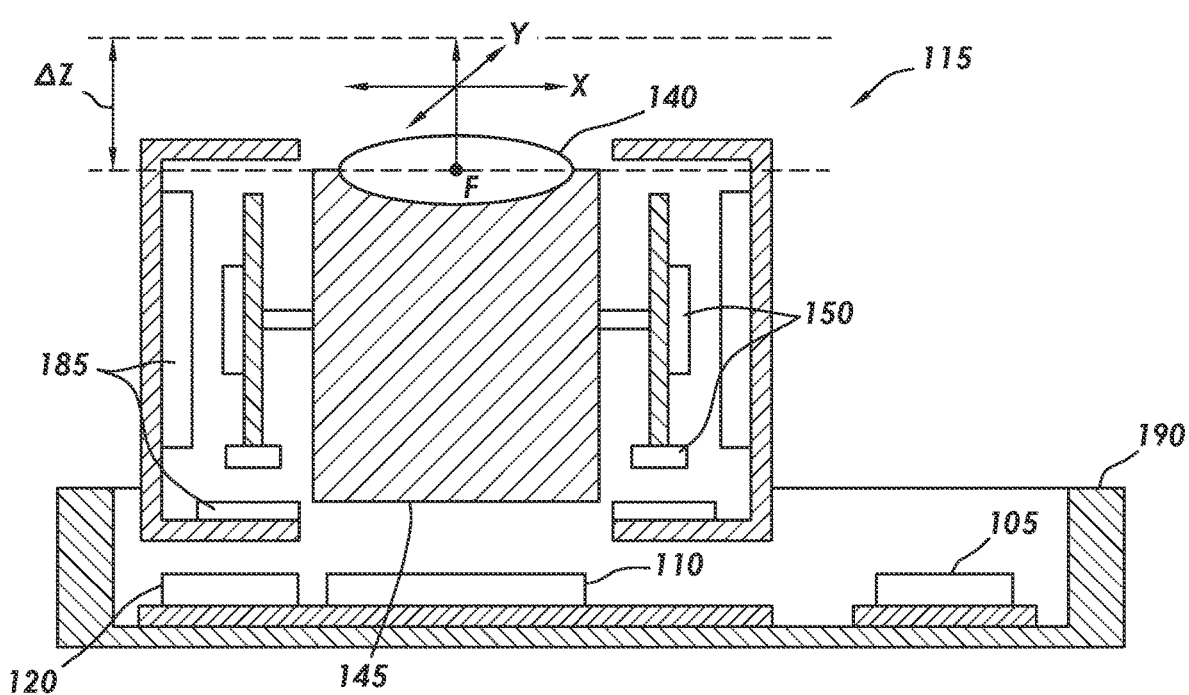
FIG. 7 is a block diagram illustrating a second exemplary optical image stabilization system controlling a moving body, in accordance with various embodiments of the present technology.

Moving to FIGS. 6 and 7, the moving body 135 can comprise a lens 140 and a lens holder 145. In an exemplary embodiment, the lens 140, lens holder 145, and actuator 115 can be contained within the moving body 135. The actuator 115 can be configured as a voice coil motor (VCM) and can comprise a coil 150 and a magnet 185. The magnet 185 can be arranged on a stationary portion side of the module body such that it faces the coil 150. The stationary portion of the actuator 115 can be fixed with respect to a housing 190 of the system 100.

The actuator 115 can be responsive to the driving currents supplied by the actuator control driver 120 and generate the driving forces according to the driving currents. The actuator 115 can also apply the driving forces to the moving body 135 to position the moving body 135 to the target position to correct for any displacement/deviations caused by the disturbance signal 130. For instance, the actuator 115 can be configured to position the lens 140 in the X-axis direction, the Y-axis direction, and/or the Z-axis direction in response to receiving the corrected driving currents from the actuator control driver 120.

The image signal processor 125 can be configured to perform the primary processing operations of the system 100, including the processing operations associated with performing the inertial force correction scheme. The image signal processor 125 can be implemented externally to the image sensor 110. In an exemplary embodiment, the image signal processor 125 can be configured to analyze a set of logic values and estimate the position of the moving body 135 at any given time. The image signal processor 125 can also be configured to calculate the target position of the moving body 135. The image signal processor 125 can be further configured to determine the magnitude of the corrected driving currents along with their corresponding driving forces.

The image signal processor 125 can issue time varying commands to the actuator control driver 120 to generate the corrected driving currents, which can then be sent to the actuator 115 to position the moving body 135 according to the target position. For example, the image signal processor 125 can determine various position instruction values, $P_{REF(X,Y,Z)}$, and can instruct the system 100 to position the lens 140 in the X-axis direction, Y-axis direction, and/or Z-axis direction according to its value. The position instruction values $P_{REF(X,Y,Z)}$ can be generated based on the amplified phase-corrected output signals generated by the actuator control driver 120. The corrected driving currents can be determined by superimposing a correction current, $I_{CORR}$, on a base current, $I_0$. The base current, $I_0$, can be determined according to the position instruction values, $P_{REF(X,Y,Z)}$, and the correction current, $I_{CORR}$, can be determined according to the driving forces required to cancel out the inertial force applied to the moving body 135. The image signal processor 125 can comprise any suitable processing device, such as microprocessors, application processors, microcontrollers, programmable logic devices, or the like.

It will be appreciated that the system 100 can comprise position sensors 180 capable of monitoring the position of the moving body 135 at any given time. It will also be appreciated that the position sensors 180 can be capable of being used in both an open-loop and a closed-loop manner. For example, when the system 100 is operating in a closed-loop manner (see FIG. 3), the position sensors 180 can comprise Hall sensors.

Figure 8:
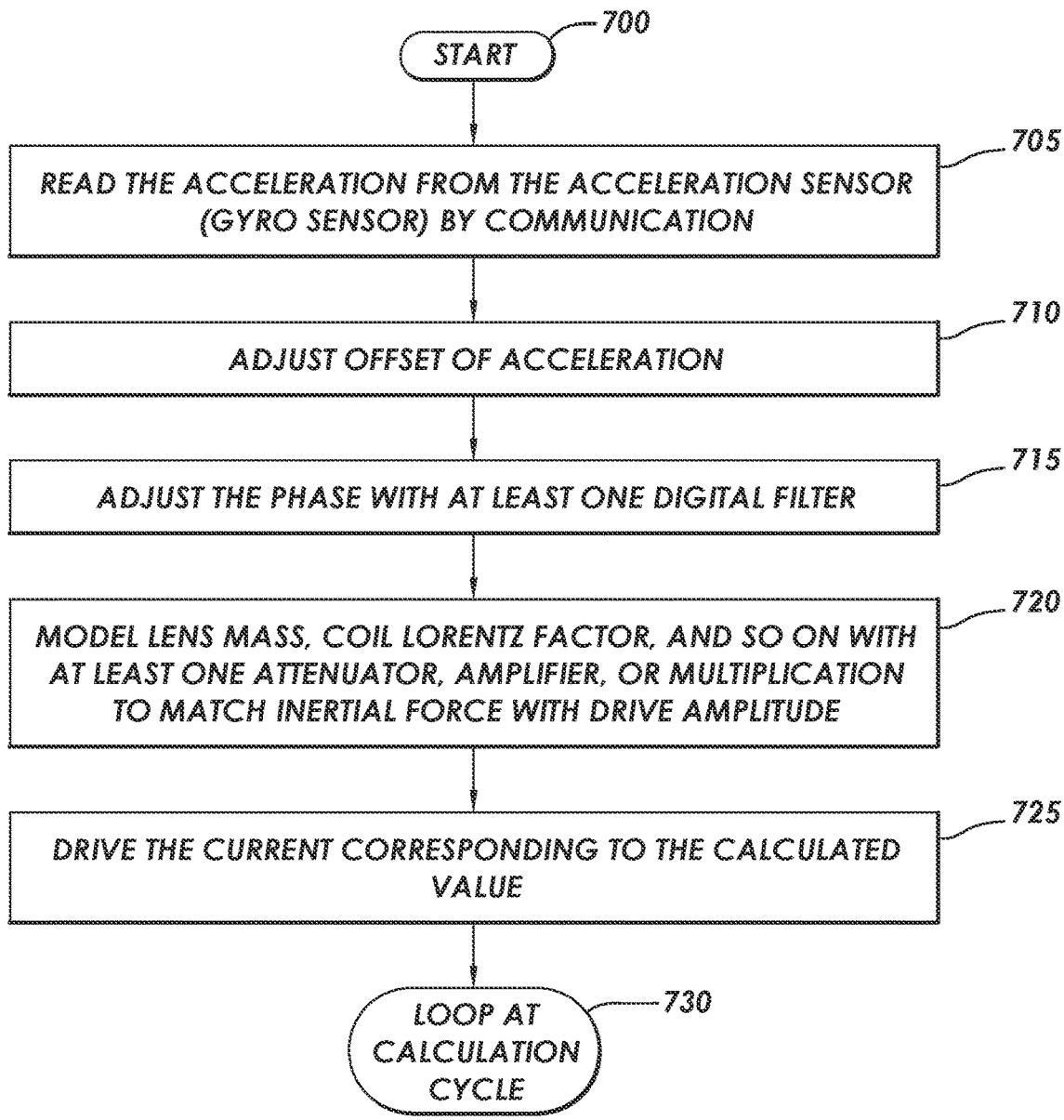
FIG. 8 is a flow diagram illustrating an exemplary method for operating an optical image stabilization system, in accordance with various embodiments of the present technology.

Turning now to FIG. 8, is flow diagram illustrates an exemplary method for operating the optical image stabilization system, in accordance with various embodiments of the present technology. A method can start, at start block 700, which can include an optional step of an OIS system performing the inertial force correction scheme in the reference state, i.e., the state prior to the system receiving disturbance signal. In the reference state, the OIS system can perform calibration to determine an offset error and/or bias associated with a gyro sensor.

Moving to block 705, a disturbance signal (as described herein) is applied to the system in an X-axis direction and/or Y-axis direction. The disturbance signal can cause a moving body in communication with the OIS system to be displaced (i.e., move) in the X-axis direction and/or Y-axis direction. The moving body can be, for example, a lens or a lens barrel in a camera.

An acceleration sensor, for example, a gyro sensor, detects the disturbance signal and generate the sensor data based on the detected disturbance signal. The sensor data can contain angular velocity and/or acceleration data generated by the disturbance signal that are applied to the moving body in each axis direction. The acceleration sensor transmits at least the acceleration data acceleration output signal, to an actuator control driver for processing.

At block 710, the acceleration output signal is received the actuator control driver and is processed to adjust the offset of the acceleration output signal. In some embodiments, an offset correction circuit can generate an offset-corrected acceleration signal that is substantially free from the acceleration offset by subtracting a signal equal in magnitude to the acceleration offset from the acceleration output signal.

Moving to block 715, once the offset-corrected acceleration signal is received by a phase correction component, it may comprise the phase offset error. The phase correction component can apply a phase compensation technique to generate a phase-corrected acceleration signal, which can be shifted in phase with respect to the acceleration signal supplied to it from the offset correction component. To correct the offset-free acceleration signal according to certain embodiments, it is desired that a phase offset error of 0 be sustained. As described herein, the phase correction component can comprise at least one digital filter configured to adjust the phase of the offset-corrected acceleration signal.

Moving to block 720, an inertial force cancellation circuit receives the phase-corrected acceleration signal. The inertial force cancellation circuit can comprise any suitable signal gain controller, such as an attenuator, amplifier, or the like, can be used to amplify the phase-corrected acceleration signal by one or more of the predetermined coefficients. Accordingly, the coefficients can be determined based on the length ("L") of the coil in an actuator, the mass of the moving body ("m"), and the magnetic flux density ("B") associated with the moving body. For example, in the case where two predetermined coefficients are used one coefficient can be a "calibration" coefficient having a constant value that remains the same for each moving body, while the other coefficient can change across the different modules depending on the values of m, B, and L. The inertial force cancellation circuit outputs an amplified phase-corrected output signal.

Moving now to block 725, the inertial force cancellation circuit can transmit the amplified phase-corrected output signal to a constant current driver, which in turn can supply the corrected driving currents to the actuator configured to cancellation the disturbance signal applied to the moving body. When the disturbance signal has been applied to the OIS system, the moving body can experience the inertial force ("F"). If the correction is not enabled, the moving body can deviate from the target position. In some embodiments, the actuator is configured as a voice coil motor. The Lorentz force ("$F_L$") applied to the moving body by the voice coil motor to cancel the disturbance signal applied to the OIS system.

Once the actuator receives the corrected driving current, it can convert the corrected driving current to a corresponding driving force. The driving force can then be applied to the moving body in a direction opposite to that of the inertial force, thereby substantially canceling the inertial force. At block 735, another iteration of a program loop can be executed by the processor when the OIS system is performing the inertial force correction scheme.

Figure 9:
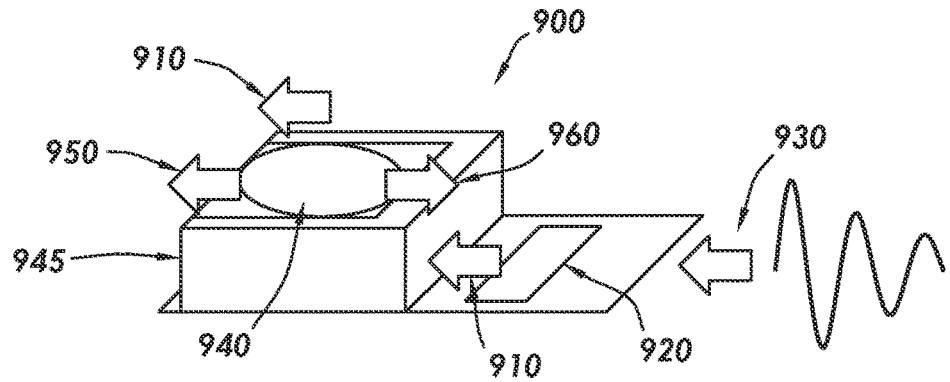
FIG. 9 is perspective view of drawing illustrating different forces on a moving body, in accordance with various embodiments of the present technology.
Figure 10:
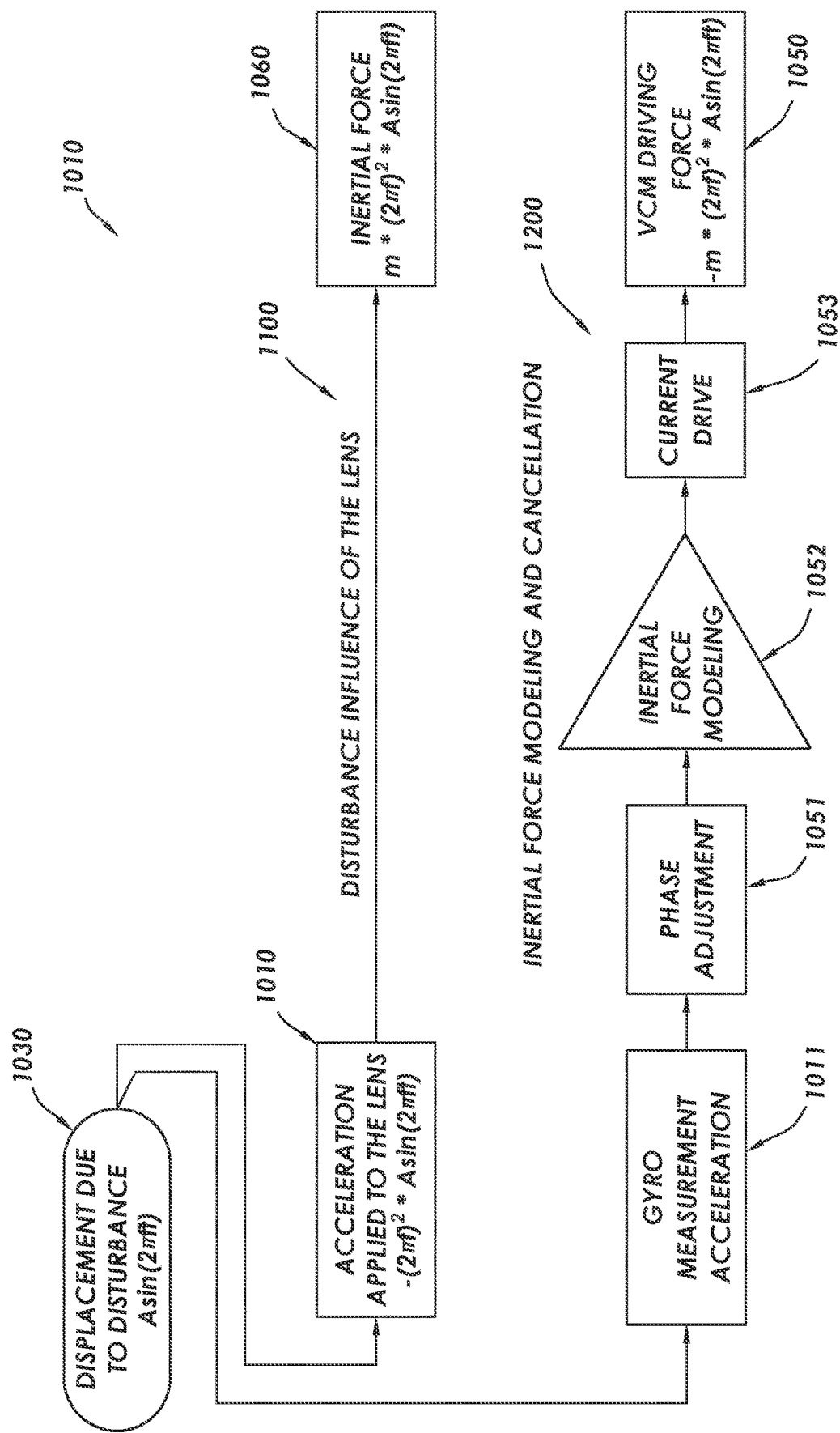
FIG. 10 is a flow chart illustrating equations for calculating an inertial force on a moving body and a cancellation of the inertial force on a moving body, in accordance with various embodiments of the present technology.

FIG. 9 is a perspective view of drawing illustrating different forces on a moving body. FIG. 10 is a flow chart illustrating equations for calculating an inertial force on a moving body and a cancellation of the inertial force on a moving body.

OIS system 900 comprises a fixed body 950 containing a moving body 940. The fixed body 945 can be mounted on a substrate 915. A gyro sensor 920 can be mounted on the substrate 915.

The gyro sensor 920 detects the disturbance signal 930. The gyro sensor 920 can generate sensor data, such as velocity information and/or acceleration information associated with the disturbance signal 930.

The disturbance signal 930 applied to the moving body 940 can be expressed mathematically by the following formula:

$$D(t) = A \sin 2\pi f t \quad (1)$$

where D(t) is the displacement at time t, A is the amplitude of the displacement, and f is an arbitrary frequency of the disturbance signal 130.

The acceleration 910 applied to the moving body 940 can be expressed mathematically by the following formula:

$$a(t) = -(2\pi f)^2 A \sin 2\pi f t + \gamma \quad (2)$$

where a(t) is the acceleration applied to the moving body 940 at time t, $(2\pi f)^2 A$ is the amplitude of the acceleration 910 output signal, f is the frequency of the disturbance signal 930, and γ is the offset error and/or bias presented in the form of an acceleration offset.

The inertial force 960 applied to the moving body 940 can be $$m^*(2\pi f)^2 A \sin(2\pi f t). \quad (3)$$

The offset-corrected acceleration signal can be expressed mathematically by the following formula:

$$a(t) = -(2\pi f)^2 A \sin 2\pi f t - \gamma + \gamma_{CORR} \quad (4)$$

where a(t) is the acceleration applied to the moving body 135 at time t, $(2\pi f)^2 A$ is the amplitude of the acceleration, f is the frequency of the disturbance signal 130, γ is the acceleration offset, and $\gamma_{CORR}$ is an offset correction signal equal in magnitude to γ. The offset correction circuit can then transmit the offset-corrected acceleration signal to the phase correction circuit for additional processing.

Once the offset-corrected acceleration signal is received by the phase correction circuit, it can comprise the phase offset error. Accordingly, the offset-free acceleration signal received from the offset correction circuit for each drive axis can be expressed mathematically by the following formula:

$$a(t) = -(2\pi f)^2 A \sin(2\pi f t - \theta) \quad (5)$$

where a(t) is the acceleration applied to the moving body 135 at time t, $(2\pi f)^2 A$ is the amplitude of the acceleration, f is the frequency of the disturbance signal 930, and θ is an acceleration phase offset error.

Accordingly, the phase-corrected acceleration signal can be expressed mathematically by the following expression:

$$a(t) = -(2\pi f)^2 A \sin(2\pi f t - \theta + \theta_{CORR}) \quad (6)$$

where a(t) is the acceleration applied to the moving body 135 at time t, $(2\pi f)^2 A$ is the amplitude of the acceleration, f is the frequency of the disturbance signal 130, θ is the phase offset error, and $\theta_{CORR}$ is a phase offset error correction equal in magnitude to the phase offset error. The phase correction circuit can then transmit the phase-corrected acceleration signal to the inertial force correcting circuit for further processing.

In some embodiments, the actuator can be configured as a voice coil motor, the Lorentz force, $F_L$, applied to the moving body 940 by the constant current driver as a result of applying the disturbance signal 930 to the system 100 can be expressed mathematically by the following formula:

$$F_L = IBL \quad (7)$$

where B is the magnetic flux density, I is the applied current, and L is the overall effective length of the coil.

Accordingly, the correction current, $I_{CORR}$, can be calculated according to the following mathematical formula:

$$I_{CORR} = \frac{F_{CORR}}{BL} \quad (8)$$

where $F_{CORR}$, which is equal in magnitude to the inertial force, is the correction force applied to the moving body 940 by the constant current driver.

The inertial force, F, can be calculated according to the following mathematical formula:

$$F = ma(t) \quad (9)$$

where m is the mass of the moving body 940.

Accordingly, the correction current, $I_{CORR}$, can be calculated according to the following mathematical formula:

$$I_{CORR} = \frac{ma(t)}{BL}. \quad (10)$$

In some embodiments, m, B, and L can be known constants. In other embodiments, B and L can fluctuate. Any suitable signal gain controller, such as an attenuator, amplifier, or the like, can be used to amplify the phase-corrected acceleration signal by one or more of the predetermined coefficients. Accordingly, the coefficients can be determined based on the length of the coil, the mass of the lens, and the magnetic flux density associated with the moving body. For example, in the case where two predetermined coefficients are used (e.g., in manufacturing/production of different modules, where each module has its own m, B, and L values), one coefficient can be a "calibration" coefficient having a constant value that remains the same for each module, while the other coefficient can change across the different modules depending on the values of m, B, and L. The inertial force correcting circuit can then transmit the amplified phase-corrected output signals to the constant current driver, which in turn can supply the corrected driving currents to the X-axis and the Y-axis of the actuator.

Next, the base current, $I_0$, corresponding to the position instruction value, $P_{REF(X,Y,Z)}$, can be determined. In one embodiment, the base current, $I_0$, can be calculated according to certain design parameters of the system 100. For example, the balance between the driving force generated by the actuator 115 and the inertial force applied to the moving body 135 by the disturbance signal 130 can be represented by the following mathematical expression:

$$BI_0L = kx \quad (11)$$

where "k" is a spring constant.

In another embodiment, the base current, $I_0$, can be calculated according to the stroke sensitivity of the actuator. The stroke sensitivity of the actuator can be determined during the reference state. The stroke sensitivity, S, can be a constant that represents the slope of the disturbance signal 930 with respect to its acceleration signal. By acquiring the stroke sensitivity, S, the base current, $I_0$, to be used for providing the displacement x can be calculated based on the following Expression.

$$I_0 = \frac{x}{S}. \quad (12)$$

Accordingly, the base current, $I_0$, to be applied can be calculated based on the following expression:

$$I_0 = \frac{kx}{BL}. \tag{13}$$

The spring constant k can be calculated according to the following mathematical formula:

$$k = m(2\pi f_0)^2 \tag{14}$$

where $f_0$ is the value of the resonance frequency.

By superimposing the correction current $I_{CORR}$ on the base current, $I_0$, by means of the calculation as described above, i.e., by adding or otherwise subtracting $I_{CORR}$ to or from $I_0$ depending on the direction in which the disturbance signal 130 is applied, the corrected driving current can be calculated.

Further reference to FIG. 9, the modeling and cancellation can be calculated using the flowchart illustrated in FIG. 10. The disturbance signal 930 is calculated by the formula in the inertial force block 1030. In some embodiments, the formula in the inertial force block 1030 can be described by Equation (1). The acceleration block 1010 calculates the acceleration applied to the moving body 940. The acceleration is calculated by the formula in the acceleration block 1010. In some embodiments, the formula in the acceleration block 1010 can be described by Equation (2). The disturbance influence 1100 of the moving body 940 is equivalent to the inertial force 960, which is calculated by the formula in the inertial force block 1060.

The inertial force modeling and cancellation 1200 generates a force that cancels the inertial force 960 as calculated by the formula the inertial force block 1030. In some embodiments, the formula in the inertial force block 1030 can be described by Equation (3). The inertial force modeling and cancellation 1200 can be determined using the drivers and circuits previously described herein.

The inertial force modeling and cancellation 1200 first receives the data of the disturbance signal 930 from the gyro sensor 920 in gyro measurement block 1011, which is calculated by the formula described by Equation (15). In some embodiments, Equation (15) is equal to Equation (2).

$$-(2\pi f)^2 * A \sin(2\pi ft) \tag{15}$$

However, if the gyro measurement block 1011 includes offset adjustment, which is calculated by the formula described by Equation (16). In some embodiments, Equation (16) is equal to Equation (5).

$$a(t) = -(2\pi f)^2 A \sin(2\pi ft - \theta). \tag{16}$$

The phase adjustment block 1051 receives the acceleration output and adjusts a phase of the output, as described herein. The phase adjustment can be calculated by the formula described by Equation (17). In some embodiments, Equation (17) is equal to Equation (6).

$$-(2\pi f)^2 A \sin(2\pi ft - \theta + \theta_{CORR}). \tag{17}$$

The phase adjusted signal is received by the inertial force modeling block 1052, which can be calculated by the formula described by Equation (18).

$$\frac{m}{B*L} * (2\pi f)^2 A \sin(2\pi ft) \tag{18}$$

The current drive block 1053 receives the adjusted signal from the inertial force modeling block 1052, and calculates the Lorentz force by the current drive using the formula described by Equation (19).

$$m*(2\pi f)^2 A \sin(2\pi ft) \tag{19}$$

The current drive block 1053 applies the voltage to the actuator to offset the disturbance signal 930 on the moving body 940.

The particular implementations shown and described are illustrative of the technology and its best mode and are not intended to otherwise limit the scope of the present technology in any way. Indeed, for the sake of brevity, conventional manufacturing, connection, preparation, and other functional aspects of the apparatus cannot be described in detail. Furthermore, the connecters and points of contact shown in the various figures are intended to represent exemplary physical relationships between the various elements. Many alternative or additional functional relationships or physical connections can be present in a practical system.

Various modifications and changes can be made, however, without departing from the scope of the present technology as set forth. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment can be executed in any appropriate order and are not limited to the explicit order presented in the specific examples. Additionally, the components and/or elements recited in any system embodiment can be combined in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that can cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but can also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, can be varied or otherwise particularly adapted to specific environments, manufacturing specifications, design parameters or other operating requirements without departing from the general principles of the same.

The present technology has been described above with reference to an exemplary embodiment. However, changes and modifications can be made to the exemplary embodiment without departing from the scope of the present technology. These and other changes or modifications are intended to be included within the scope of the present technology.

What is claimed is:

1. An optical image stabilization system, comprising:
a sensor configured to detect a disturbance signal, wherein the disturbance signal applies a force to a moving body, and wherein the force causes the moving body to displace;
a processor configured to determine:
a target position of the moving body according to the detected disturbance signal in a first direction; and
a corrected driving current according to the target position and based on an angular rate in a second direction perpendicular to the first direction;
an actuator configured to:
receive the corrected driving current; and
position the moving body in response to receiving the corrected driving current, wherein the moving body is positioned in a direction opposite to that of the displacement; and
an actuator driver configured to controllably operate the actuator according to the corrected driving current
wherein the processor is further configured to:
calculate a current needed to produce a driving force for positioning the moving body according to the target position;
calculate a position compensation value corresponding to the first direction and based on an angular rate in the second direction perpendicular to the first direction; and
correct the current needed to produce the driving force for positioning the moving body according to the target position by the position compensation value to determine the corrected driving current.

2. The optical image stabilization system of claim 1, wherein the moving body comprises a lens.

3. The optical image stabilization system of claim 1, further comprising a position sensor configured to measure movements of the moving body.

4. The optical image stabilization system of claim 1, wherein the actuator comprises a voice coil motor, and wherein the voice coil motor comprises a magnet configured to move the moving body.

5. The optical image stabilization system of claim 1, further comprising a Hall sensor capable of detecting a magnetic field produced by the magnet.

6. A method for improving optical image stabilization, comprising:
detecting a disturbance signal applied to a moving body in a first direction, wherein the disturbance signal applies a force to the moving body, and wherein the force causes the moving body to displace;
converting the disturbance signal to an output signal;
generating an offset-corrected output signal from the output signal;
generating a phase-corrected output signal from the offset-corrected output signal;
generating a linearity corrected signal based on an angular rate in a second direction perpendicular to the first direction;
generating a corrected driving current according to the phase-corrected output signal and based on the linearity corrected signal; and
using the corrected driving current to position the moving body in a direction opposite to that of the displacement.

7. The method of claim 6, wherein the output signal is an acceleration signal.

8. The method of claim 6, wherein the offset-corrected output signal is free from an offset error.

9. The method of claim 6, wherein the phase-corrected output signal is shifted in phase with respect to the offset-corrected output signal.

10. The optical image stabilization system of claim 1, further comprising a Hall sensor capable of detecting a magnetic field produced by the magnet and to generate position data regarding a position of the moving body in the first direction; and
wherein the position compensation value is calculated based on the position data from the Hall sensor.

11. An optical image stabilization system, comprising:
a sensor configured to detect a first disturbance signal in a first direction and a second disturbance signal corresponding to a second direction perpendicular to the first direction, wherein the first disturbance signal and the second disturbance signal apply a force to a moving body, and wherein the force causes the moving body to displace;
a processor configured to determine:
a target position of the moving body according to the first disturbance signal in the first direction;
a current needed to produce a driving force for positioning the moving body according to the target position;
a position compensation value corresponding to the first direction and based on the second disturbance signal; and
a corrected driving current based on the current needed to produce the driving force and based on the position compensation value; and
an actuator configured to:
receive the corrected driving current; and
position the moving body in response to receiving the corrected driving current, wherein the moving body is positioned in a direction opposite to that of the displacement; and
an actuator driver configured to controllably operate the actuator according to the corrected driving current.

12. The optical image stabilization system of claim 11, wherein at least one of the first disturbance signal and the second disturbance signal is an acceleration signal and another one of the of the first disturbance signal and the second disturbance signal is an angular rate.

* * * * *